US007608139B2

(12) United States Patent
Gotanda et al.

(10) Patent No.: US 7,608,139 B2
(45) Date of Patent: Oct. 27, 2009

(54) ERASABLE IMAGE FORMING MATERIAL

(75) Inventors: Takeshi Gotanda, Yokohama (JP); Satoshi Takayama, Kawasaki (JP); Kenji Sano, Tokyo (JP); Yumiko Sekiguchi, Yokohama (JP); Shinya Sakurada, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 20 days.

(21) Appl. No.: 11/879,910

(22) Filed: Jul. 19, 2007

(65) Prior Publication Data

US 2008/0070781 A1 Mar. 20, 2008

(30) Foreign Application Priority Data

Sep. 15, 2006 (JP) .............................. 2006-251256

(51) Int. Cl.
*C09D 11/00* (2006.01)

(52) U.S. Cl. .................. 106/31.23; 106/31.16; 430/19; 430/330

(58) Field of Classification Search ....................... None
See application file for complete search history.

(56) References Cited

U.S. PATENT DOCUMENTS

| | | | | |
|---|---|---|---|---|
| 4,770,904 | A * | 9/1988 | Zink | 427/150 |
| 5,149,689 | A | 9/1992 | Zink | 503/221 |
| 5,627,126 | A | 5/1997 | Amano et al. | 503/226 |
| 5,663,115 | A * | 9/1997 | Naito et al. | 503/201 |
| 5,849,651 | A | 12/1998 | Takayama et al. | 501/201 |
| 6,017,386 | A * | 1/2000 | Sano et al. | 106/31.32 |
| 6,177,383 | B1 | 1/2001 | Amano et al. | 503/201 |
| 6,277,208 | B1 * | 8/2001 | Sano et al. | 134/19 |
| 6,375,742 | B2 * | 4/2002 | Sano et al. | 118/600 |
| 7,208,449 | B2 | 4/2007 | Sano et al. | 503/216 |
| 2005/0159311 | A1 * | 7/2005 | Sano et al. | 503/225 |
| 2005/0221206 | A1 * | 10/2005 | Takayama et al. | 430/17 |
| 2006/0111237 | A1 | 5/2006 | Takayama et al. | 503/221 |
| 2007/0072773 | A1 | 3/2007 | Takayama et al. | 503/215 |

FOREIGN PATENT DOCUMENTS

| | | |
|---|---|---|
| JP | 7-81236 | 3/1995 |
| WO | 2006/124560 A2 | 11/2006 |

OTHER PUBLICATIONS

*Database WPI Week 198427*; Derwent Publications Ltd., London, GB; AN 1984-167987 XP002444170 & JP 59 091450 A (Matsushita Elec. Ind. Co. Ltd.) May 26, 1984; abstract.

International Search Report dated Aug. 6, 2007 from corresponding European Patent Application Serial No. 07023002.6-2304.

* cited by examiner

*Primary Examiner*—David Wu
*Assistant Examiner*—Vu Nguyen
(74) *Attorney, Agent, or Firm*—Ohlandt, Greeley, Ruggiero & Perle, L.L.P.

(57) ABSTRACT

An erasable image forming material is provided, which includes a binder resin, and a color former and a developer dispersed in the binder resin. The color former is amorphous.

6 Claims, 5 Drawing Sheets

ERASABLE IMAGE FORMING MATERIAL

CROSS-REFERENCE TO RELATED APPLICATIONS

This application is based upon and claims the benefit of priority from prior Japanese Patent Application No. 2006-251256, filed Sep. 15, 2006, the entire contents of which are incorporated herein by reference.

BACKGROUND OF THE INVENTION

1. Field of the Invention

The present invention relates to an erasable image forming material and a method for manufacturing the same.

2. Description of the Related Art

Protection of forests is important for protecting the global environment and for suppressing the greenhouse effect caused by $CO_2$. It has been a great problem to efficiently utilize paper resources in order to keep the amount of additional felling of trees to a minimum and to maintain the balance between the amount of tree felling and the regeneration of forests including reforestation.

Reuse of presently available paper resources consists of recycling, by which paper pulp, after a de-inking step for extracting image forming materials, are made into low-quality paper again to be used according to respective purposes. However, several problems have been pointed out regarding this reuse method, including the high cost of the de-inking step and the additional environmental pollution caused by the disposal of waste liquid.

In contrast, reuse of hardcopies by, for example, an eraser for pencils and correction liquid for ball-point pens has been practically used. While reused paper sheets are used for the same purpose plural times by preventing paper quality from being degraded as much as possible, recycled paper sheets may be used for other purposes, although the quality of the paper is reduced. Accordingly, reuse and recycling involve different concepts from one another.

Reuse is more important in terms of protection of paper resources, and the amount of additionally required paper resources can be suppressed to a minimum level when appropriate reuse is performed before recycling. For example, rewritable paper has been proposed in recent years as special paper aiming at reuse of hardcopy paper sheets. One hundred or more use cycles is possible by using rewritable paper technology so long as slight damage to the paper such as wrinkling and creasing is not an objection, and efficiency of use of paper resources may be remarkably improved.

However, rewritable paper is not suitable for recycling since it is special paper, although reuse is possible. It is difficult to apply rewritable paper to recording technologies other than thermal recording.

The inventors of the present invention have noticed that a color is developed when the interaction between a color former and a developer increases, while the decolorization occurs when the interaction decreases. The inventors have developed an image forming material, which enables a decolorized state of the image forming material to be stably maintained at around room temperature by adding a decolorizing agent to a composition containing the color former and developer and which fixes the decolorized state for a long time by treating with heat and a solvent, an image decolorizing process, and an image decolorizing apparatus. The inventors have proposed this novel technology as a paper reuse technology in place of currently available technologies.

The image forming material has high stability of colored and decolorized states of the image as well as being quite safe, and is applicable to uses such as electrophotographic toners, liquid inks, ink ribbons and any writing instruments. In addition, the material has the advantage of the possibility of large-scale decolorizing treatment, which has been impossible in the conventional art.

The inventors have also found that cellulose as a constituent element of paper has a function of the decolorizing agent, and have proposed that decolorization is possible by treating with heat and a solvent even in the image forming material that contains no decolorizing agent in restricted uses using paper as a recording medium.

For example, it has been disclosed that a clear image can be formed by using an image forming material containing the color former, the developer and a binder resin, while the image can be favorably decolorized. Decolorization is possible in this image forming material since the developer is transferred to the paper sheet by heating at a predetermined temperature and the color former becomes insensitive to the developer.

However, the image forming material itself showed weak color because only a part of the color former in the image forming material turned into a colored state.

While an alternative method in which color density is increased by adding the color former in excess may be devised, the excess color former that does not contribute to color development is wasted, while the excess compound adversely affects the properties of the image forming material. For example, storage stability and mechanical strength are reduced since the additive amount of low-molecular-weight components different from major components (matrix) increases in the color forming material.

BRIEF SUMMARY OF THE INVENTION

An erasable image forming material according to one aspect of the present invention comprises: a binder resin; and a color former and a developer dispersed in the binder resin, the color former being amorphous.

A method of manufacturing an erasable image forming material according to one aspect of the present invention comprises: melting a color former by heating it at a temperature of a melting point or more; cooling the molten color former at a temperature lower than the melting point; and mixing a developer and a binder to the color former after cooling.

DETAILED DESCRIPTION OF THE INVENTION

Embodiments of the invention will be described in detail below.

An erasable image forming material according to the embodiment contains a color former, a developer and a binder resin. In the image forming material, the color former develops a color by interaction between the color former and the developer dispersed in the binder resin. A clear image can be formed on paper by an electrophotographic technology by forming fine particles of the image forming material.

The color of the image forming material of this embodiment can be erased (decolorized) by heating.

Decolorization of the image forming material is caused by extinguishing the interaction between the color former and developer in the binder resin by heating. The developer is transferred to paper as a recording medium upon heating. Since the transferred developer forms hydrogen bonds with hydroxyl groups of cellulose serving as a constituent element of paper, the image forming material is decolorized.

Color development of the color former may be lower than the color density expected from the amount of addition. Therefore, dispersion state of the color former in the matrix containing the binder resin was investigated.

When an erasable image forming material containing the color former and developer is manufactured, the color former and developer are usually kneaded in the molten matrix. While the material manufactured by this method may seem perfectly homogeneous by visual observation, aggregates of the non-dispersed color former were confirmed by observation under an electron microscope.

It was attempted to improve color developability by improving solubility of the color former in the binder resin. Consequently, it was found that color developability of the erasable image forming material may be improved by heating the color former at a temperature not lower than the melting point thereof without adding the developer followed by mixing with the developer after cooling.

For example, a solid having low crystallinity can be obtained by heating crystal violet lactone (CVL) as a color former at a temperature not lower than the melting point thereof (190° C.) followed by cooling.

Figure 1:
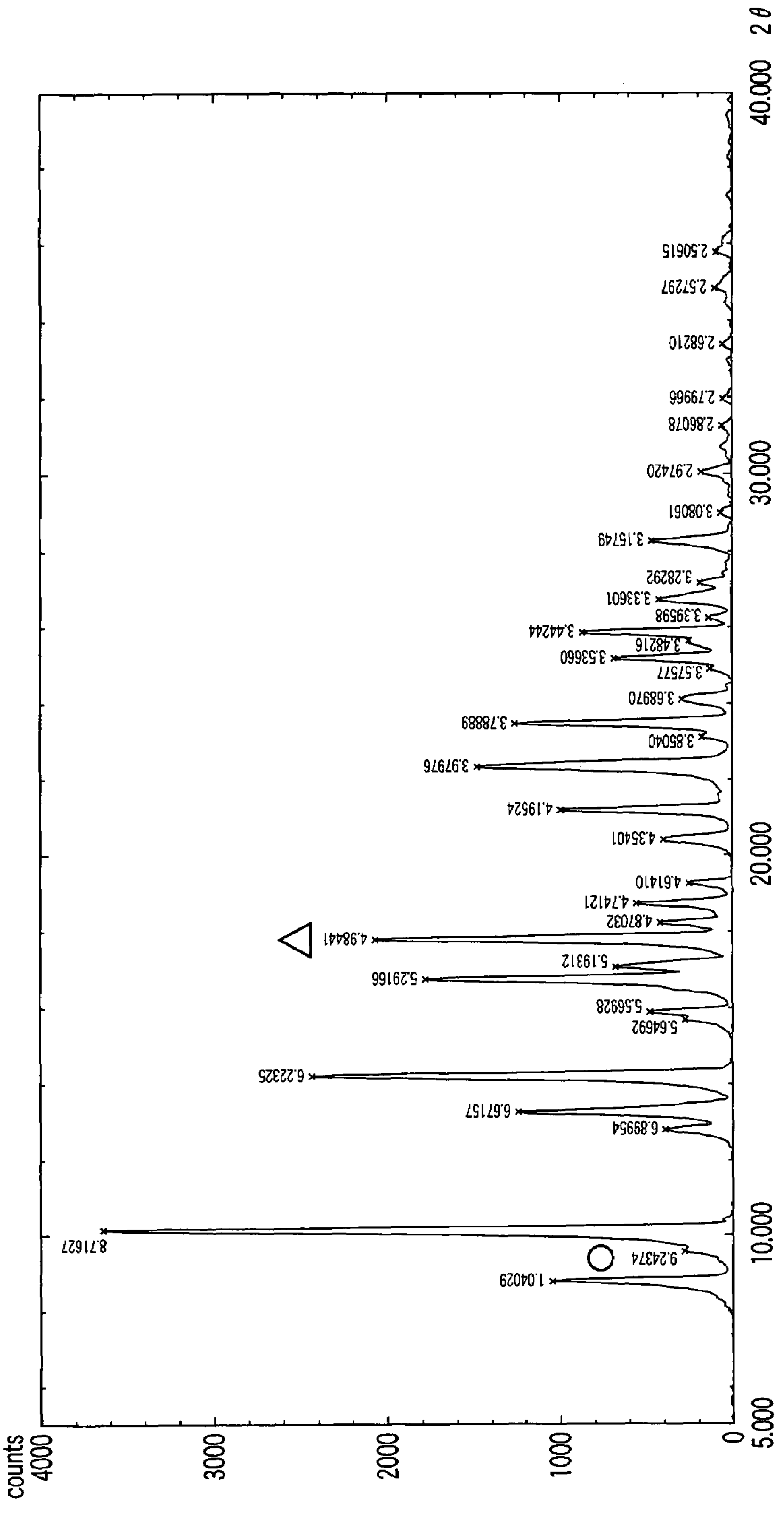
FIG. 1 shows the result of X-ray diffraction of a color former before heating.
Figure 2:
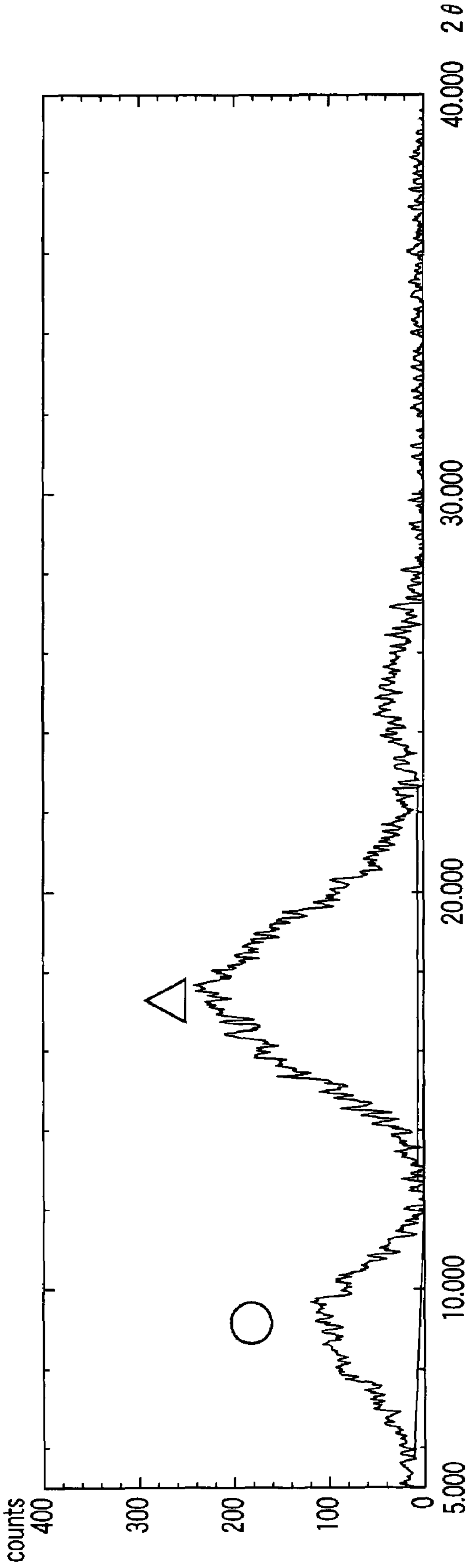
FIG. 2 shows the result of X-ray diffraction of the color former after heating.

FIGS. 1 and 2 show the difference in crystallinity of CVL before and after heating. CVL was heated at 198° C. for 10 minutes. A solid obtained by allowing it to stand at 2° C. for 5 minutes was used as the solid after heating. Crystallinity of the powder of the solid was confirmed by X-ray diffraction under the conditions shown in Table 1.

TABLE 1

| | | |
|---|---|---|
| X-ray | Target | CuKα |
| | X-ray tube voltage and current | 40 kV-40 mA |
| Scanning rate | deg/min | 2°/min, |
| Angle measuring range | | 0° ≦ 2 θ ≦ 40° |

TABLE 1-continued

| | |
|---|---|
| Divergence slit | ½ deg. |
| Scattering slit | ½ deg. |
| Receiving slit | 0.3 mm |

FIG. 1 shows the result of X-ray diffraction of the CVL before heating, and FIG. 2 shows the result of X-ray diffraction of the CVL after heating. Table 2 shows 2 θ, face dimension, counts, half value width and $I/I_0$ value in FIG. 1. Table 3 shows the start angle, stop angle, HKL, peak angle, integrated intensity, buck intensity, net intensity, half value width and integrated width in FIG. 2.

TABLE 2

| Peak No. | 2 θ | Face dimension | Counts | Half value width | $I/I_0$ |
|---|---|---|---|---|---|
| 1 | 8.800 | 10.04029 | 1047 | 0.210 | 29 |
| 2 | ○9.560 | 9.24374 | 284 | 0.180 | 8 |
| 3 | 10.140 | 8.71627 | 3644 | 0.240 | 100 |
| 4 | 12.820 | 6.89954 | 394 | 0.270 | 11 |
| 5 | 13.260 | 6.67157 | 1244 | 0.210 | 35 |
| 6 | 14.220 | 6.22325 | 2442 | 0.270 | 68 |
| 7 | 15.680 | 5.64692 | 282 | 0.150 | 8 |
| 8 | 15.900 | 5.56928 | 485 | 0.240 | 14 |
| 9 | 16.740 | 5.29166 | 1782 | 0.240 | 49 |
| 10 | 17.060 | 5.19312 | 683 | 0.360 | 19 |
| 11 | Δ17.780 | 4.98441 | 2070 | 0.240 | 57 |
| 12 | 18.200 | 4.87032 | 419 | 0.210 | 12 |
| 13 | 18.700 | 4.74121 | 503 | 0.240 | 16 |
| 14 | 19.220 | 4.61410 | 257 | 0.210 | 8 |
| 15 | 20.380 | 4.35401 | 403 | 0.330 | 12 |
| 16 | 21.160 | 4.19524 | 996 | 0.240 | 28 |
| 17 | 22.320 | 3.97976 | 1474 | 0.390 | 41 |
| 18 | 23.080 | 3.85040 | 182 | 0.180 | 5 |
| 19 | 23.460 | 3.78889 | 1247 | 0.240 | 35 |
| 20 | 24.100 | 3.68970 | 290 | 0.450 | 8 |
| 21 | 24.880 | 3.57577 | 127 | 0.180 | 4 |
| 22 | 25.160 | 3.53660 | 689 | 0.240 | 19 |
| 23 | 25.560 | 3.48216 | 254 | 0.240 | 7 |
| 24 | 25.860 | 3.44244 | 865 | 0.240 | 24 |
| 25 | 26.220 | 3.39598 | 137 | 0.210 | 4 |
| 26 | 26.700 | 3.33601 | 427 | 0.300 | 12 |
| 27 | 27.140 | 3.28292 | 186 | 0.270 | 6 |
| 28 | 28.240 | 3.15749 | 471 | 0.240 | 13 |
| 29 | 28.960 | 3.03061 | 67 | 0.390 | 2 |
| 30 | 30.020 | 2.97420 | 184 | 0.300 | 6 |
| 31 | 31.240 | 2.86078 | 67 | 0.300 | 2 |
| 32 | 31.940 | 2.79966 | 57 | 0.270 | 2 |
| 33 | 33.380 | 2.68210 | 56 | 0.330 | 2 |
| 34 | 34.840 | 2.57297 | 101 | 0.240 | 3 |
| 35 | 35.800 | 2.50615 | 99 | 0.300 | 3 |

TABLE 3

| No. | Start angle | Stop angle | H K L | Peak angle | Integrated intensity | Buck intensity | Net. int | Half value width | Integrated breathe |
|---|---|---|---|---|---|---|---|---|---|
| 1 | 5.760 | 12.140 | 0 0 0 | ○9.208 | 18900 | 1918 | 16982 | 2.959 | 2.969 |
| 2 | 12.440 | 22.660 | 0 0 0 | Δ17.438 | 52033 | 0 | 52033 | 4.340 | 4.300 |
| 3 | 22.660 | 23.200 | 0 0 0 | 25.867 | 6896 | 0 | 6396 | 2.939 | 2.508 |

As shown in FIG. 1, diffraction peaks indicating the presence of a crystal structure is confirmed in CVL before heating. On the other hand, only peaks with an X-ray count of 300 or less were observed in the solid after heating. This shows that diffraction peak counts ascribed to the crystal structure decreased after heating.

While the half value width of all the diffraction peaks observed in CVL before heating are 1 or less, those after heating are 2 or more when the half value width of the diffraction peaks before and after heating are compared. With respect to the peaks at a diffraction angle 2θ in the range from 9 to 10° that are common in both cases (denoted by ○), the half value width before heating (2θ=9.56°) was 0.180 while the half value width after heating (2θ=9.208°) was 2.959. With respect to the peaks at a diffraction angle 2θ in the range from 17 to 18° (denoted by Δ), the half value width before heating (2θ=17.78°) was 0.240 while the half value width after heating (2θ=17.438°) was 4.340. The half value widths of all the peaks were increased 10 times or more by heating. These results show that CVL after heating is substantially amorphous.

Since an amorphous color former requires smaller energy for dissolution than a crystalline color former by an amount corresponding to the crystal lattice energy, dispersibility of the amorphous color former to the binder resin may be improved. Since the amorphous color former becomes susceptible to the developer by improving dispersibility, it may be conjectured that color development of the image forming material is improved.

For manufacturing the image forming material, a solid is obtained at first by heating the color former at a temperature of not lower than the melting point followed by cooling. Then, the color former and developer are mixed in a matrix consisting of a binder resin, and the mixture is further kneaded so that the color former and developer are dispersed in the matrix. The kneaded mixture is crushed once, and the image forming material is obtained by pulverizing the crushed solid. External additives (additives) may be added when the image forming material is used as a toner.

It is recommended to heat the color former alone when the color former is heated at a temperature not lower than the melting point, because the color former is liable to be decomposed by heat after developing a color. Colored residues remain when the color former is decomposed by heat. Since the decolorizing function of the colored residue is low, the color is not erased by heating and the image may be left behind. The color former may be heated in the presence of the resin. The resin available may be the same as the binder resin to be described below.

The color former develops a color by the action of the developer when the developer and color former are mixed together. The color former in the mixture is decomposed by heat during the heat treatment and a colored component is generated. Consequently, the color former containing the colored component is used in the erasable image forming material, and the colored component is left behind even after erasing by heating. The difference of contrast before and after erasing becomes insufficient and the remaining colored component gives an impression as if the image is not erased. The residual image after erasing is largely affected by the hue of the colored component when the colored component is mingled in the image forming material, and the image forming material becomes more yellowish. Sense of use of the image forming material is impaired due to yellowish impression. For these reasons, it is recommended to heat the color former alone when it is heated at a temperature not lower than the melting point.

The color former is heated at a temperature not lower than the melting point of the image forming material. It is desirable that the heating temperature does not exceed the melting point by 50° C. or more, for avoiding the color former itself from being decomposed by heat. While heating may be completed when the temperature has reached the melting point of the image forming material, it is preferable to cool the material after the color former has been completely melted. Accordingly, it is desirable to maintain the temperature for 10 minutes or more after the temperature has reached the melting point by heating in order to reduce the amount of non-melted color former as much as possible. However, since the color former itself may be decomposed by the overheating, the holding time is more preferably less than 30 minutes.

It is recommended to cool the color former to a temperature lower than the melting point after heating. The color former is preferably placed in an environment at a temperature lower than the melting point for cooling in order to reduce the substantial temperature of the color former. For example, since a portion of the color former may remain at a temperature not lower than the melting point when the color former is allowed to stand at 20° C. or less, the cooling temperature is preferably maintained for 1 minute or more. For avoiding moisture from being mingled during cooling, it is preferable that a part of the color former is not cooled to a dew point or lower.

Examples of the color former include electron-donating organic compounds such as leucoauramine, diaryl phthalimide, polyaryl carbinol, acyl auramine, aryl auramine, rhodamine B lactam, indoline, spiropyran and fluoran.

Specific examples thereof include crystal violet lactone (CVL), malachite green lactone, 2-anilino-6-(N-cyclohexyl-N-methylamino)-3-methyl fluoran, 2-anilino-3-methyl-6-(N-methyl-N-propylamino)fluoran, 3-[4-(4-phenylaminophenyl)aminophenyl]amino-6-methyl-7-chloro fluoran, 2-anilino-6-(N-methyl-N-isobutylamino)-3-methyl fluoran, 2-anilino-6-(dibutylamino)-3-methyl fluoran, 3-chloro-6-(cyclohexylamino)fluoran, 2-chloro-6-(diethylamino)fluoran, 7-(N,N-dibenzylamino)-3-(N,N-diethylamino)fluoran, 3,6-bis(diethylamino)fluoran-γ-(4'-nitro)anilinolactam, 3-diethylaminobenzo[a]-fluoran, 3-diethylamino-6-methyl-7-aminofluoran, 3-diethylamino-7-xylidinofluoran, 3-(4-diethylamino-2-ethoxyphenyl)-3-(1-ethyl-2-methylindol-3-yl)-4-azaphthalide, 3-(4-diethylaminophenyl)-3-(1-ethyl-2-methylindol-3-yl)phthalide, 3-diethylamino-7-chloroanilinofluoran, 3-diethylamino-7,8-benzofluoran, 3,3-bis(1-n-butyl-2-methylindol-3-yl)phthalide, 3,6-dimethylethoxy fluoran, 3-diethylamino-6-methoxy-7-amino fluoran, DEPM(CAS: 25289-00-3), ATP(CAS: 42530-35-8), ETAC(CAS: 59129-79-2), 2-(2-chloroanilino)-6-dibutylamino fluoran, crystal violet carbinol, malachite green carbinol, N-(2,3-dichlorophenyl)leucoauramine, N-benzoyl auramine, rhodamine B lactam, N-acetyl auramine, N-phenyl auramine, 2-(phenyliminoethanedilydene)-3,3-dimethyl indoline, N-3,3-trimethylindolino benzospiropyran, 8'-methoxy-N-3,3-trimethylindolino benzospiropyran, 3-diethylamino-6-methyl-7-chloro fluoran, 3-diethylamino-7-methoxy fluoran, 3-diethylamino-6-benzyloxy fluoran, 1,2-benz-6-diethylamino fluoran, 3,6-di-p-toluidino-4,5-dimethylfluoran-phenylhydrazido-γ-lactam and 3-amino-5-methyl fluoran. One of these compounds may be used alone, or a plurality of them may be used as a mixture. Various colors are developed by appropriately selecting the color formers, which may be compatible to various colors.

The developer permits the color former to develop a color by interacting with the color former. Examples of the developer available include phenols, metal phenolates, metal carboxylates, benzophenones, sulfonic acid, sulfonate salts, phosphoric acids, metal phosphates, acidic phosphate esters, metal salts of acidic phosphate esters, phosphorous acids and metal phosphites. One of these developers may be used alone, or a plurality of them may be used as a mixture.

Specific examples of preferably used developer include gallic acid; gallate esters such as methyl gallate, ethyl gallate, n-propyl gallate and i-butyl gallate; dihydroxybenzoic acid and esters thereof such as 2,3-dihydroxybenzoic acid and methyl 3,5-dihydroxybenzoate; hydroxyacetophenones such as 2,4-dihydroxy acetophenone, 2,5-dihydroxy acetophenone, 2,6-dihydroxy acetophenone, 3,5-dihydroxy acetophenone and 2,3,4-trihydroxyacetophenone; hydroxy benzophenones such as 2,4-dihydroxy benzophenone, 4,4'-dihydroxy benzophenone, 2,3,4-trihydroxy benzophenone, 2,4,4'-trihydroxy benzophenone, 2,2',4,4'-tetrahydroxy benzophenone and 2,3,4,4'-tetrahydroxy benzophenone; biphenols such as 2,4'-biphenol and 4,4'-biphenol; and polyvalent phenols such as 4-[(4-hydroxyphenyl)methyl]-1,2,3-benzenetriol, 4-[(3,5-dimethyl-4-hydroxyphenyl)methyl]-1,2,3-benzenetriol, 4,6-bis[(3,5-dimethyl-4-hydroxyphenyl)methyl]-1,2,3-benzenetriol, 4,4'-[1,4-phenylenebis(1-methylethylidene)bis(benzene-1,2,3-triol)], 4,4'-[1,4-phenylenebis(1-methylethylidene)bis(1,2-benzenediol)], 4,4',4"-ethylidenetrisphenol, 4,4'-(1-methylethylidene)bisphenol and methylenetris-p-cresol.

The most favorable developers are gallate esters such as ethyl gallate, n-propyl gallate, i-propyl gallate and butyl gallate; and hydroxy benzophenones such as 2,4-dihydroxy benzophenone, 4,4'-dihydroxy benzophenone, 2,3,4-trihydroxy benzophenone, 2,4,4'-trihydroxy benzophenone, 2,2',4 4'-tetrahydroxy benzophenone and 2,3 4,4'-tetrahydroxy benzophenone.

The binder resin has following features, that is, the color former and developer are dispersible in the binder resin when the image forming material is manufactured, while the developer is transferred to paper when the image is erased by heating.

Developed color density is higher when the content of polar groups in the binder resin is lower in the erasable image forming material of the embodiment. A non-polar resin is preferably used as the binder resin for obtaining a high contrast between the colored and decolorized states. These resins are polystyrene, polystyrene derivatives and styrene copolymers. Specific examples of styrene monomers used for producing these resins include styrene, o-methyl styrene, m-methyl styrene, p-methyl styrene, p-ethyl styrene, 2,4-dimethyl styrene, p-n-butyl styrene, p-tert-butyl styrene, p-n-hexyl styrene, p-n-octyl styrene, p-n-nonyl styrene, p-n-decyl styrene, p-n-dodecyl styrene, p-methoxy styrene, p-phenyl styrene, p-chloro styrene and 3,4-dichloro styrene. These styrene monomers may be used in combination.

The styrene monomer may be copolymerized with a monomer having polar groups. Examples of the monomer having the polar groups include methyl methacrylate, ethyl methacrylate, isobutyl methacrylate, cyclohexyl methacrylate, ethylhexyl methacrylate, lauryl methacrylate, stearyl methacrylate, vinyl acetate, vinyl propionate, methacrylonitrile, dimethyl maleate, diethyl maleate, dimethyl fumarate, dibutyl fumarate, dimethyl itaconate, dibutyl itaconate, methylvinyl ether, ethylvinyl ether, n-butylvinyl ether and isobutyl ether. One of these vinyl monomers having polar groups may be used alone, or a plurality of them may be used in combination.

Examples of the favorable binder resin consisting of the copolymer include styrene/n-butyl methacrylate copolymer, styrene/isobutyl methacrylate copolymer, styrene/ethyl acrylate copolymer, styrene/n-butyl acrylate copolymer, styrene/methyl methacrylate copolymer, styrene/glycidyl methacrylate copolymer, styrene/dimethylaminoethyl methacrylate copolymer, styrene/diethylaminoethyl methacrylate copolymer, styrene/diethylaminopropyl acrylate copolymer, styrene/2-ethylhexyl acrylate copolymer, styrene/butyl acrylate-N-(ethoxymethyl)acrylamide copolymer, styrene/ethyleneglycol methacrylate copolymer, styrene/4-hexafluorobutyl methacrylate copolymer, styrene/butadiene copolymer, acrylonitrile/acrylic rubber/styrene ternary copolymer, acrylonitrile/styrene/acrylate ester ternary copolymer, styrene/acrylonitrile copolymer, acrylonitrile/polystyrene chloride/styrene ternary copolymer, acrylonitrile/ethylene-vinyl acetate/styrene ternary copolymer, styrene/p-chlorostyrene copolymer, styrene/propylene copolymer, styrene/butadiene copolymer, styrene/maleate ester copolymer and styrene/maleic anhydride copolymer. These acrylate monomers may be copolymerized by using only one kind of them, or plural kinds of monomers may be mixed and copolymerized with styrene.

While copolymers obtained by copolymerizing butadiene, maleate ester and chloroprene may be used, it is desirable that the content of these components in the binder resin is 10% or less. While the above-mentioned copolymers of acrylate monomers may be used by mixing with polystyrene, the polyacrylate component may be a mixture with a homopolymer or a copolymer. Butadiene, maleate ester and chloroprene may be copolymerized with styrene or acrylate in a content of 10% or less.

The thermal property of the toner resin is usually represented by a softening point and glass transition point. The usually used toner is a resin having a softening point from 60 to 190° C. and a glass transition point from 20 to 110° C. The favorable thermal property of the binder resin used for the image forming material according to the embodiment has a softening point from 95 to 160° C. and a glass transition point from 50 to 80° C. The fixing temperature of the toner becomes so high when the softening point and glass transition point are too high that the color may be decolorized by fixing. On the other hand, storage stability of the toner may be impaired when the softening point and glass transition point are low. The softening point can be measured with a flow tester while the glass transition point is measured with a differential scanning calorimeter (DSC).

The softening point is defined as a temperature (T1/2) when the amount of the flowed-out sample reached a half of the total volume when measured with a flow tester (trade name: CFT-500, manufactured by Shimadzu Co.) using 1.0 g of the sample under a condition of a nozzle size of 1.0 mmϕ× 10.0 mm, a weight of 30 kg·f and a heating rate of 3° C./min.

The glass transition temperature is defined as a temperature at a shoulder after melt-quenching measured with DSC. The shoulder is an inflection point as "an intermediate point" before and after the change of the specific heat.

It is recommended that the number of the polar groups in the binder resin is as small as possible. When the number of the polar groups is small, the density of the developed color becomes high when the image forming material is prepared by kneading. At the same time, compatibility between the color former and the binder resin at the time of heating is improved. Therefore, the binder resin having a smaller number of the polar groups is preferable for enhancing the contrast between the colored state and decolorized state.

Examples of the binder resin having high contrast between the colored state and decolorized state include non-polar resins such as polystyrene and polyolefin. More preferable examples of the resin include styrene-butadiene copolymer, styrene-propylene copolymer and derivatives thereof when the resin is used for the toner resin.

The developer is added in a proportion from 0.1 times or more to 10 times or less of the number of moles of the color former. In other words, the color former and the developer are blended with the binder resin so that the molar ratio of the color former to the developer is 1:0.1 to 10. Interaction between the developer and the color former may be insufficient to give poor color developing performance when the proportion of the color former to the developer is lower than 1.0. Further, when the ratio exceeds 10.0, the proportion of the material not contributing to color development increases so that the excess amount of the material is not only wasted but also may adversely affect the property of the image forming material.

The binder resin serves as a matrix that constitutes the image forming material. The proportion of the binder resin is in the range of 70 wt % or more to 90 wt % or less relative to the amount of the toner when the resin is used for the toner, although the proportion depends on the content of the additive described later. Interaction between the color former and the developer may be adversely affected when the proportion is less than 70 wt %, while color developing performance may be impaired due to the decrease of the proportion of the color former and the developer to the image forming material when the content is larger than 90 wt %.

When the image forming material according to the embodiment is used for the toner, various additives usually used for the toner may be added other than the color former, developer and binder resin.

Another additive (referred to as charge control agent hereinafter) may be used for adjusting charge characteristics of the toner. The color of the charge control agent is recommended not to be left behind after erasure. Therefore, the charge control agent is preferably colorless or transparent. Examples of the negative charge control agent available include E-89 (trade name of calixarene derivatives, manufactured by Orient Chemical Co.), N-1, N2 and N-3 (trade names of phenolic compounds, manufactured by Japan Carlit Co.), LR 147 (trade name of boron compounds, manufactured by Japan Carlit Co.) and FCA-1001N (trade name of styrene-sulfonic acid resin, manufactured by Fujikura Kasei Co.). E-89 and LR 147 are more favorable. Examples of the positive charge control agent include TP-302 (CAS#116810-46-9) and TP-415 (CAS#117342-25-2) manufactured by Hodogaya Chemical Co., P-51 (trade name of quaternary amine compound) and AFP-B (trade name of polyamine oligomer) manufactured by Orient Chemical Co., and FCA-201PB (trade name of styrene-acrylic quaternary ammonium resin) manufactured by Fijikura Kasei Co.

Waxes may be blended for controlling fixability. The wax is preferably composed of components not permitting the color former to develop a color. Examples of the wax include higher alcohols, higher ketones and higher fatty acid esters. The acid value of the wax may be restricted to 10 mg KOH/g or less. The weight average molecular weight of the wax is preferably from $10^2$ to $10^5$, more preferably from $10^2$ to $10^4$. Low molecular weight polypropylene, low molecular weight polyethylene, low molecular weight polybutylene and low molecular weight polyalkane may be used when the weight average molecular weight falls within the above-mentioned range.

The amount of addition of the wax is preferably from 0.1 to 30 parts by weight, more preferably from 0.5 to 15 parts by weight. The amount of addition of the wax to the toner is preferably 5 parts by weight or less when the toner is used for heat roll fixing, since the wax is added for imparting peelability from a heat roll to the toner. The wax may be used as a major component of the image forming material when the toner is used for pressure fixing. The wax is used in the core when the toner has a microcapsular structure.

A plasticizer may be added for imparting flexibility to the image forming material.

The plasticizer may be also added for improving erasability. Since the image forming material is decolorized due to binding of the developer to the hydroxyl group of paper, spreading diffusion of the developer in a medium affects decolorizing performance of the image forming material. Since inhibition of diffusion of the developer by dispersion force, dipolar force and hydrogen bond is reduced by properly plasticizing the binder resin by adding the plasticizer, erasability may be further enhanced.

Examples of the plasticizer include phthalic acid derivatives, adipic acid derivatives, azelaic acid derivatives, cebacic acid derivatives, maleic acid derivatives, fumaric acid derivatives, trimellitic acid derivatives, citric acid derivatives, oleic acid derivatives, ricinoleic acid derivatives, stearic acid derivatives, sulfonic acid derivatives, phosphoric acid derivatives, glycerin derivatives, paraffin derivatives and diphenyl derivatives.

Specific examples include di(2-ethylhexyl)phthalate, dimethyl phthalate, diethyl phthalate, dibutyl phthalate, diisobutyl phthalate, diheptyl phthalate, diisooctyl phthalate, octyldecyl phthalate, diisodecyl phthalate, ditridecyl phthalate, ethylhexyldecyl phthalate, dinonyl phthalate, butylbenzyl phthalate, dicyclohexyl phthalate, diallyl phthalate, dimethoxyethyl phthalate, dibutoxyethyl phthalate, methylphthalylethyl glycol, ethylphthalylethyl glycolate, butylphthalylbutyl glycolate, di-n-butyl adipate, diisobutyl adipate, di(2-ethylhexyl)adipate, diisooctyl adipate, diisodecyl adipate, octyldecyl adipate, benzyl-n-butyl adipate, polypropylene adipate, polybutylene adipate, dibutoxyethyl adipate, benzyloctyl adipate, di(2-ethylhexyl)azelate, di-2-ethylhexyl-4-thio azelate, di-n-hexyl azelate, diisobutyl azelate, dimethyl cebacate, diethyl cebacate, dibutyl cebacate, di(2-ethylhexyl)cebacate, diiosoctyl cebacate, di-n-butyl maleate, dimethyl maleate, diethyl maleate, di-(2-ethylhexyl) maleate, dinonyl maleate, dibutyl fumarate, di(2-ethylhexyl) fumarate, tri(2-ethylhexyl)trimellitate, triisodecyl trimellitate, n-octyl trimellitate, n-decyl trimellitate, triisooctyl trimellitate, diisooctyl trimellitate, monoisodecyl trimellitate, triethyl citrate, tri-n-butyl citrate, methyl oleate, butyl oleate, methoxyethyl oleate, tetrahydrofulfuryl oleate, glyceryl monooleate, diethyleneglycol monooleate, methylacetyl ricinoleate, butylacetyl ricinoleate, glyceryl monoricinoleate, diethyleneglycol monoricinoleate, n-butyl stearate, glyceryl monostearate, chlorinated methyl stearate, benzenesulfone butylamide, o-toluene sulfonamide, p-toluene sulfonamide, N-ethyl-p-toluene sulfonamide, o-tolueneethyl sulfonamide, p-tolueneethyl sulfonamide, N-cyclohexyl-p-toluene sulfonamide, triethyl phosphate, tributyl phosphate, tri(2-ethylhexyl)phosphate, triphenyl phosphate, tris(chloroethyl)phosphate, polyethyleneglycol, chlorinated paraffin and chlorinated diphenyl.

While the optimum amount of addition of the plasticizer delicately differs depending on the kind thereof, it is about 0.5% by weight or less. Phthalic acid derivatives and trimellitic acid derivatives each having benzene ring or alicyclic structure are particularly effective.

Additives for controlling fluidity, storability, anti-blocking ability and polishablity for photo conductor drum may be further blended as necessary in the image forming material according to the embodiment. Examples of the additive available include silica fine particles, metal oxide fine particles and cleaning assistant. Examples of the material of the silica fine particle include silicon dioxide, sodium silicate, zinc silicate and magnesium silicate. Examples of the material of the metal oxide fine particles include zinc oxide, magnesium oxide, zirconium oxide, strontium titanate and barium titanate. Examples of the cleaning assistant include resin fine particles such as polymethyl methacrylate, polyvinylidene fluoride and polytetrafluoroethylene particles.

The additive may be subjected to surface treatment such as hydrophobizing treatment. Since the hydrophobizing treatment is usually applied when the additive is used for a toner, treatment agents such as a silane coupling agent, a titanium coupling agent and silicone oil are used when the toner is negatively charged. Further, treatment agents such as an aminosilane-base agent and silicone oil having amines at the side chain are used when the toner is positively charged. The amount of addition of the additive is preferably from 0.05 to 5 parts by weight, more preferably from 0.1 to 3.0 parts by weight, relative to 100 parts by weight of the toner. While the particle diameter of the primary particle used for the toner is usually from 10 to 20 nm in the case of silica fine particles, particles with a particle diameter up to 100 nm may be used. The diameter may be larger when the material is other than silica, and the usually used particle has an average particle diameter from 0.05 to 3 μm.

The preferable range of the particle diameter of the toner satisfies the following condition: volume average particle diameter −6 to 20 μm; the content of the particles with a diameter of 5 μm or less in the particle number distribution −2 to 20% by particles; the content of the particles with a diameter of 5 μm or less in the particle volume distribution −0 to 5% by volume; and the content of the particles with a diameter of 20 μm or more in the particle volume distribution −0 to 5% by volume. These values may be measured with Coulter multisizer (manufactured by Coulter Co., Ltd.).

The conductivity of the erasable toner is preferably from $10^{11}$ to $10^{16}$ Ω·cm more preferably form $10^{13}$ to $10^{15}$ Ω·cm. Carriers prepared by coating iron powder, ferrite or magnetite with a resin such as a silicone resin or acrylic resin may be used for two-component development. The preferable range of the conductivity of the carrier is as follows: $10^{9}$ Ω·cm or less for the iron powder; from about $10^{6}$ to $10^{15}$ Ω·cm for ferrite; $10^{13}$ Ω·cm or more for magnetite; and $10^{13}$ Ω·cm or more for the carrier prepared by dispersing a magnetic powder pulverized to a size of about 50 μm in a resin. The conductivity may be measured by forming the toner into a disk-shape tablet with a diameter of 20 mm and a thickness of 1 mm, followed by applying an electric potential of 1 V and 1 kHz.

The erasable image forming material may be manufactured by dispersing the color former, developer and binder resin while mixing them.

A high-speed dissolver, roll mill or ball mill may be used for mixing and dispersing the color former and developer with the binder resin. Examples of the mixing and dispersing method include a wet dispersion method using a solvent, and a melt kneading method using a roll, a pressure kneader, an internal mixer or a screw extruder. A non-polar solvent is used when the material contains a decolorizing agent. A ball mill, V-type mixer, Forbarg mixer and Henschel mixer may be used for mixing.

The results of the experiment for evaluating erasing performance of the erasable image forming material according to the embodiment will be shown below.

EXAMPLE 1

CVL (3.65% by weight, leuco dye manufactured by Yamada Chemical Co.) and 2-anilino-6-(N-ethyl-N-isopentylamino)-3-methyl fluoran (0.5% by weight, leuco dye S205, manufactured by Yamada Chemical Co.) were used as color formers, ethyl gallate (2% by weight) was used as a developer, di-2-ethylhexyl phthalate (0.479% by weight) was used as a plasticizer, polypropylene wax (5% by weight) was used as a wax component, LR-147 (1% by weight, trade name, manufactured by Nippon Carlit Co.) was used as a charge control agent, and a styrene-butadiene copolymer (87.371% by weight) was used as a binder resin. Two styrene-butadiene copolymers having different contents of the butadiene unit were prepared. Matrix resin A contained 12.5% of the butadiene unit in the styrene-butadiene copolymer, while matrix B contained 15% of the butadiene unit in the styrene-butadiene copolymer.

CVL as the color former was pre-heated at 198° C. for 10 minutes, and was cooled by allowing it to stand at 2° C. for 5 minutes.

After thoroughly mixing the materials with a Henschel mixer at 140° C., the mixture was dispersed by kneading with a tri-axis kneader. The kneaded product was processed into fine powders with an average particle diameter of 11.3±0.5 μm using a pulverizer to obtain a blue electrophotographic toner according to the embodiment.

The color density of this fine powder was measured with a color difference meter CR300 (trade name: manufactured by Minolta Co.) using a powder measurement cell. The color density of the powder was determined as a common logarithm of reciprocal of the reflectivity. The color density is higher when the proportion of the color former in the color developing state is higher.

Hydrophobic silica was added to the toner prepared in a proportion of 1% by weight relative to the total amount of the toner. This toner was used for printing a solid pattern with several stages of image ID on a copy paper sheet using a printer (trade name: MFP (Primarge 351), manufactured by Toshiba Tec Co.) to prepare images for evaluating erasable performance. The image was erased by heating at 130° C. for 2 hours using a constant temperature chamber.

Figure 3:
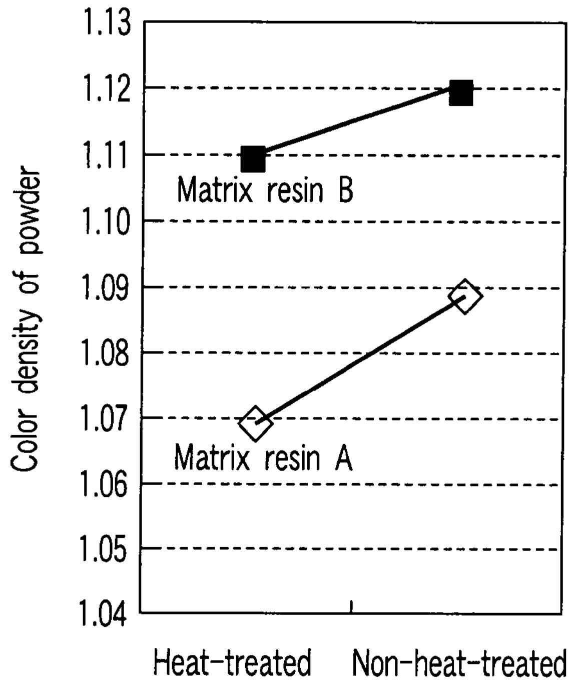
FIG. 3 is a graph showing the color density of the powder in the image forming material.
Figure 4:
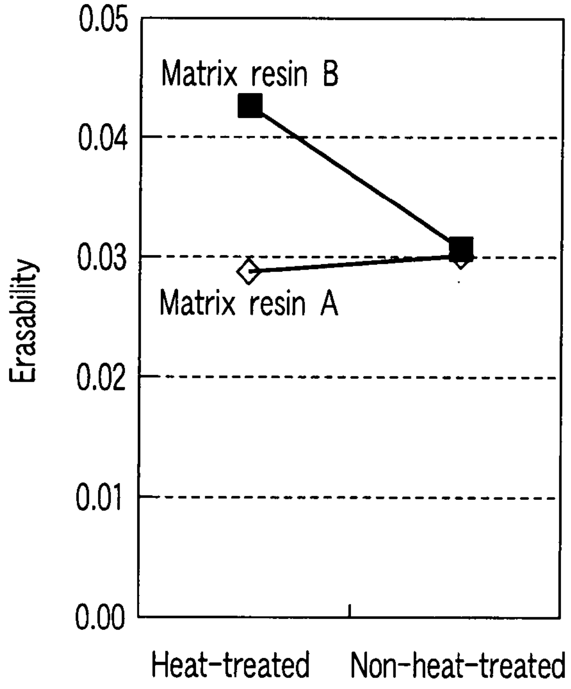
FIG. 4 is a graph showing erasability of the image forming material.

The results of the color density of the powder are shown in FIG. 3, while the results of erasable performance are shown in FIG. 4.

COMPARATIVE EXAMPLE 1

The toner was produced by the same procedure as in Example 1, except that non-heat-treated CVL was used as the color former, and color density of the powder and erasable performance thereof were investigated.

The results of the color density of the powder are shown in FIG. 3, while the results of erasable performance are shown in FIG. 4.

FIG. 3 shows that the color density of the powder is higher in Example 1 (heat-treated) than in Comparative Example 1 (non-heat-treated) when any of the matrix resins were used. FIG. 4 shows that the same erasable performance is maintained in Example 1 and Comparative Example 1 by using matrix resin A, while erasable performance was improved in Example 1 as compared with Comparative Example 1 when matrix resin B was used. It is clear that color developability is improved by using the color former heated at melting point or more. In addition, erasable performance can be improved depending on the kind of the binder resin.

Figure 5:
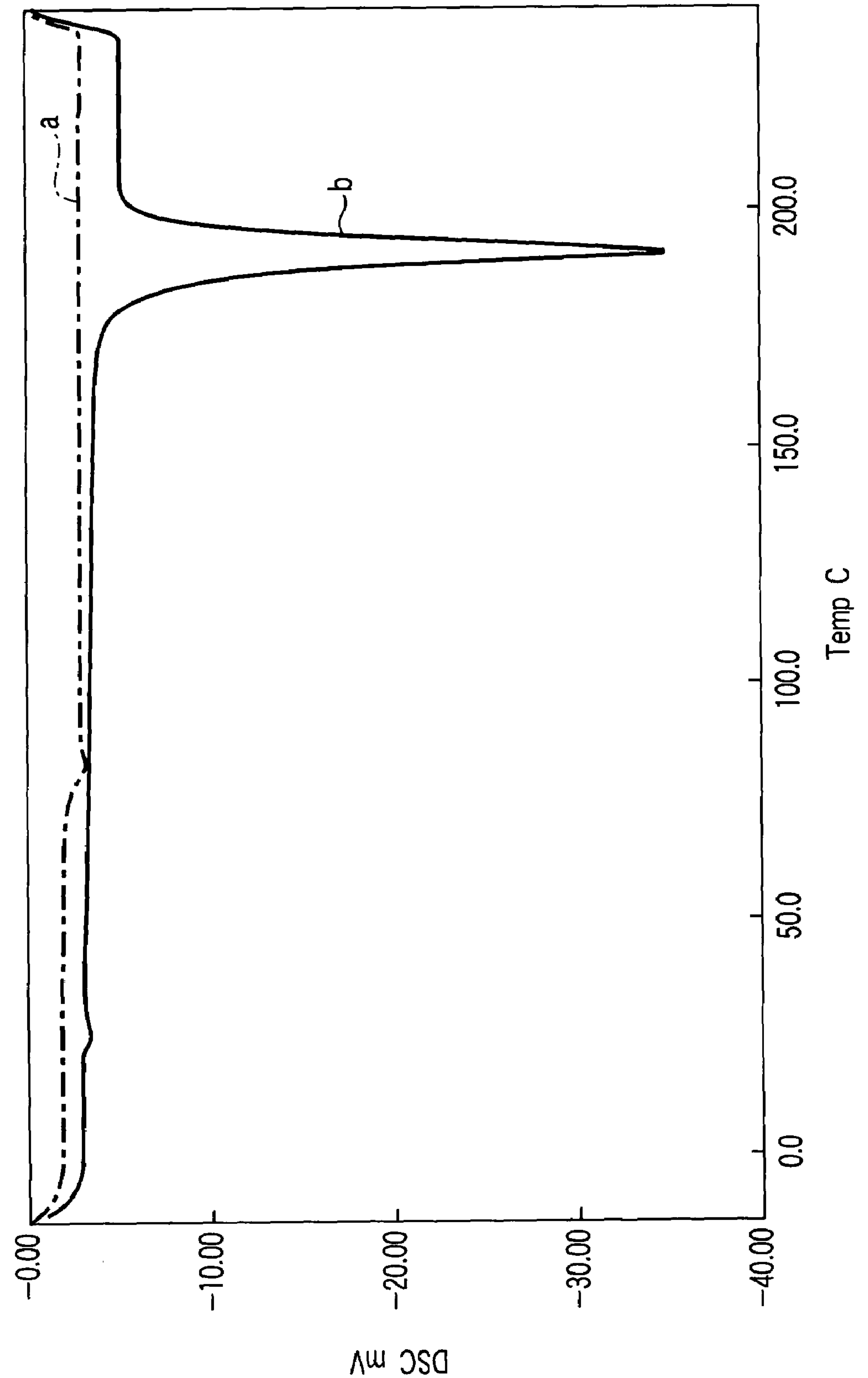
FIG. 5 shows the result of DSC measurement of the color former.

The results of DSC measurement are shown in FIG. 5. In FIG. 5, curve (a) shows the result for heat-treated CVL, while curve (b) shows the result for non-heat-treated CVL. Calorie was measured by heating about 20 mg of the sample at a rate of 10° C./min in both measurements. As shown by curve (b), non-heat-treated CVL showed an endothermic peak in the range of 170 to 210° C. Since this endothermic peak occurs by melting of the crystal, it is confirmed that non-heat-treated CVL is crystalline. On the other hand, curve (a) shows that no endothermic peak is observed in heat-treated CVL at the same temperature range. It is apparent that CVL changed from crystalline to amorphous by applying the heat treatment.

Figure 6:
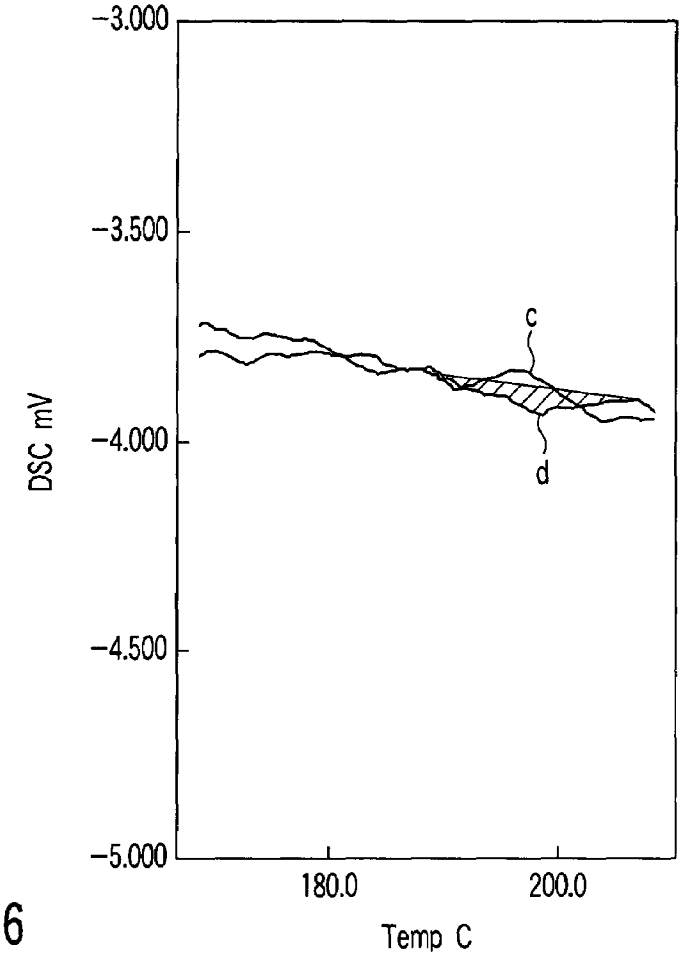
FIG. 6 shows the result of DSC measurement of a toner.

The results of DSC measurement of the toner are shown in FIG. 6. In FIG. 6, curve (c) shows the result of the toner in Example 1, while curve (d) shows the result of the toner in Comparative Example 1.

As shown by curve (d), an endothermic peak is observed in the toner of the comparative example containing non-heat-treated CVL. On the other hand, curve (c) clearly shows that the endothermic peak is not observed in the toner containing heat-treated CVL.

EXAMPLE 2

CVL and 3-(4-diethylamino-2-hexyloxyphenyl)-3-(1-ethyl-2-methylindol-3-yl)-4-azaphthalide (Blue 203, leuco dye manufactured by Yamada Chemical Co.) were used as the color former. Four kinds of the color formers were prepared by changing the proportion of CVL in the entire color former. The proportions of CVL were 100% by weight, 90% by weight, 80% by weight and 0% by weight.

Matrix resin B was used as the binder resin, and the toner was prepared by blending the color former in a concentration of 4.15% of the image forming material. The materials were thoroughly mixed with a Henschel mixer (at 110° C.), and the mixture was dispersed by kneading using a tri-axis kneader.

Figure 7:
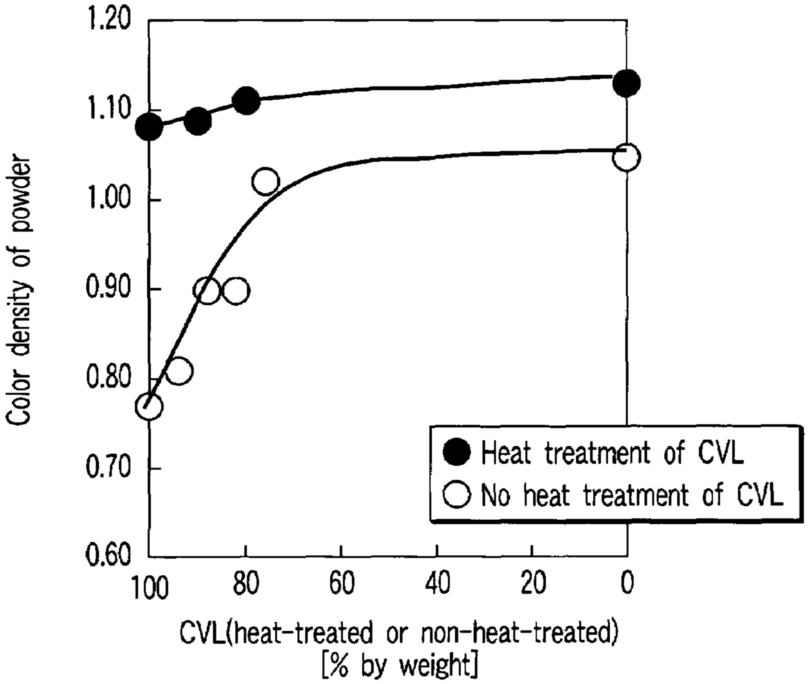
FIG. 7 is a graph showing the color density of the powder in the image forming material.

The toner was prepared by the same conditions as in Example 1 except the condition described above, and the color density of the powder was measured. The results are shown in FIG. 7.

COMPARATIVE EXAMPLE 2

Non-heat-treated CVL was used, and matrix resin A was used as the binder resin. The proportions of CVL relative to the total amount of the color former were changed to 100% by weight, 97.5% by weight, 90% by weight, 82% by weight, 79% by weight and 0% by weight. The toner was prepared by the same conditions in Example 2 except the above-mentioned condition, and the color density of the powder was measured. The results are shown in FIG. 7.

The results in Comparative Example 1 show that the color density of the powder rapidly decreases when the proportion of CVL exceeds 80% by weight because CVL is a pigment having low color developability. On the other hand, Example 2 shows that high color density of the powder is maintained even after increasing the proportion of blending of CVL.

The invention provides an image forming material excellent in color developability.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method of manufacturing an erasable image forming material, comprising:

melting a color former by heating it at a temperature of a melting point or more;

cooling the molten color former at a temperature lower than the melting point to obtain an amorphous color former; and mixing a developer and a binder to the amorphous color former after cooling.

2. The method according to claim 1, wherein the temperature for heating the color former does not exceed the melting point of the color former by 50° C. or more.

3. The method according to claim 1, wherein the color former is cooled after the color former is completely melted.

4. The method according to claim 1, wherein the color former is maintained to be heated for 10 minutes or more after the temperature has reached the melting point or more.

5. The method according to claim 4, wherein time for maintaining the heated color former is less than 30 minutes.

6. The method according to claim 1, wherein the color former is cooled by maintaining the color former at a temperature of 20° C. or less for 1 minute or more.

* * * * *